United States Patent
Bier et al.

(10) Patent No.: US 6,824,875 B2
(45) Date of Patent: Nov. 30, 2004

(54) SCRATCH-RESISTANT COATING

(75) Inventors: Peter Bier, Krefeld (DE); Peter Capellen, Krefeld (DE); Renate Weller, Duisburg (DE)

(73) Assignee: Bayer Aktiengesellschaft, Leverkusen (DE)

( * ) Notice: Subject to any disclaimer, the term of this patent is extended or adjusted under 35 U.S.C. 154(b) by 108 days.

(21) Appl. No.: 10/258,243

(22) PCT Filed: Apr. 4, 2001

(86) PCT No.: PCT/EP01/03809
§ 371 (c)(1),
(2), (4) Date: Oct. 8, 2002

(87) PCT Pub. No.: WO01/79368
PCT Pub. Date: Oct. 25, 2001

(65) Prior Publication Data
US 2003/0194561 A1 Oct. 16, 2003

(30) Foreign Application Priority Data
Apr. 17, 2000 (DE) .......................... 100 18 935

(51) Int. Cl.$^7$ ............................ B32B 9/04; B32B 13/12; B32B 27/38
(52) U.S. Cl. ........................ 428/414; 428/413; 428/446; 428/447
(58) Field of Search ............................ 428/413, 414, 428/446, 447, 412, 423.1, 425.5

(56) References Cited

U.S. PATENT DOCUMENTS

| | | | |
|---|---|---|---|
| 2,716,123 A | 8/1955 | Frostick, Jr. et al. | 260/348 |
| 2,946,701 A | 7/1960 | Plueddemann | 117/72 |
| 3,022,272 A | 2/1962 | Schnell et al. | 260/47 |
| 3,790,527 A | 2/1974 | Merrill | 260/46.5 R |
| 3,887,514 A | 6/1975 | Merrill | 260/33.6 SB |
| 4,006,271 A | 2/1977 | French et al. | 427/164 |
| 4,241,116 A | 12/1980 | Taniyama et al. | 427/386 |
| 4,242,381 A | 12/1980 | Goossens et al. | 427/387 |
| 4,242,383 A | 12/1980 | Goossens et al. | 427/387 |
| 4,243,720 A | 1/1981 | Schroeter et al. | 428/412 |
| 4,277,287 A | 7/1981 | Frye | 106/287.12 |
| 4,278,804 A | 7/1981 | Ashby et al. | 556/436 |
| 4,294,950 A | 10/1981 | Kato | 528/14 |
| 4,299,746 A | 11/1981 | Frye | 260/29.2 M |
| 4,308,315 A | 12/1981 | Frye | 428/331 |
| 4,309,319 A | 1/1982 | Vaughn, Jr. | 260/9 |
| 4,315,091 A | 2/1982 | Steinberger et al. | 528/28 |
| 4,324,712 A | 4/1982 | Vaughn, Jr. | 524/767 |
| 4,324,839 A | 4/1982 | Frye | 428/412 |
| 4,353,959 A | 10/1982 | Olson et al. | 428/331 |
| 4,367,262 A | 1/1983 | Vaughn, Jr. | 428/331 |
| 4,368,235 A | 1/1983 | Vaughn, Jr. | 428/412 |
| 4,368,236 A | 1/1983 | Frye | 428/412 |
| 4,371,585 A | 2/1983 | Memon | 428/412 |
| 4,374,879 A | 2/1983 | Roberts et al. | 428/35 |
| 4,395,463 A | 7/1983 | Kray | 428/447 |
| 4,413,088 A | 11/1983 | Frye | 524/714 |
| 4,436,851 A | 3/1984 | Vaughn, Jr. | 524/43 |
| 4,455,403 A | 6/1984 | Liebler | 524/300 |
| 4,456,647 A | 6/1984 | Schönfelder et al. | 428/216 |
| 4,474,857 A | 10/1984 | Vaughn, Jr. | 428/446 |
| 4,476,281 A | 10/1984 | Vaughn, Jr. | 524/767 |
| 4,477,528 A | 10/1984 | Frye | 428/412 |
| 4,486,503 A | 12/1984 | Vaughn, Jr. | 428/412 |
| 4,495,322 A | 1/1985 | Liebler | 524/198 |
| 4,680,232 A | 7/1987 | Factor et al. | 428/412 |
| 4,746,366 A | 5/1988 | Philipp et al. | 106/287.19 |
| 4,895,767 A | 1/1990 | Mori et al. | 428/447 |
| 5,041,313 A | 8/1991 | Patel | 427/379 |
| 5,134,191 A | 7/1992 | Takarada et al. | 524/783 |
| 5,145,559 A | 9/1992 | Auhorn et al. | 162/168.2 |
| 5,314,980 A * | 5/1994 | Morrison | 528/19 |
| 5,340,905 A | 8/1994 | Kühling et al. | 528/199 |
| 5,399,659 A | 3/1995 | Kühling et al. | 528/199 |
| 5,580,614 A | 12/1996 | Amberg-Schwab et al. | 427/493 |
| 5,644,014 A | 7/1997 | Schmidt et al. | 528/43 |
| 5,850,019 A | 12/1998 | Maiti et al. | 800/205 |
| 6,164,012 A | 12/2000 | Lechelt-Kunze et al. | 47/57.6 |
| 6,288,150 B1 * | 9/2001 | Bier | 524/91 |

FOREIGN PATENT DOCUMENTS

| | | |
|---|---|---|
| DE | 29 17 837 | 11/1980 |
| DE | 29 50 295 | 6/1981 |
| DE | 37 06 714 | 9/1988 |
| DE | 38 36 815 | 7/1990 |
| DE | 39 17 535 | 12/1990 |
| DE | 40 20 316 | 1/1992 |
| GB | 2 047 721 | 12/1980 |

OTHER PUBLICATIONS

Database WPI Section Ch, Weel 198050 Derwent Publications Ltd., London, GB; An 1980–88815C, XP002177906 & JP 55 116731 A (Toray ind Inc), Sep. 8, 1980 Zusammenfassung.
Patent Abstracts Of Japan, vol. 1997, No. 04, Apr. 30, 1997 & JP 08 333465 A (Shin Etsu Chem Co Ltd), Dec. 17, 1996 Zusammenfassung.

* cited by examiner

*Primary Examiner*—James J. Seidleck
*Assistant Examiner*—Thao Tran
(74) *Attorney, Agent, or Firm*—Joseph C. Gil; John E. Mrozinski, Jr.; James R. Franks

(57) ABSTRACT

The present invention provides a coating which contains a primer layer on a substrate with a scratch resistant layer adhered to the primer, wherein the primer layer contains a hardened epoxy resin prepared from a hardener and a multi epoxy-functional compound and the scratch resistant layer contains an epoxide group containing hydrolyzable silane. The coating may find use in coated products such as sheets, spectacles, optical lenses, automobile screens and plastic spray screens.

9 Claims, No Drawings

SCRATCH-RESISTANT COATING

FIELD OF THE INVENTION

The present invention concerns scratch-resistant coatings comprising a primer coat (P) adhering to a substrate to be coated and a scratch-resistant coat (S) adhering to the primer coat (P), whereby the primer coat (P) contains a cured epoxy resin obtainable from hardeners and multi-epoxy functional compounds, and whereby the scratch-resistant coat (S) is obtainable from hydrolysable silanes containing epoxy groups. The coatings according to the invention are particularly resistant to attack by water. The present invention further concerns products coated with these coatings.

BACKGROUND OF THE INVENTION

In order to protect materials against damaging environmental influences, they are frequently provided with a coating. Siloxane-based coatings, also known as siloxane coats, that give the materials inter alia a scratch-resistant and chemical-resistant surface, have proven to be particularly suitable. Siloxane coats are therefore also known as scratch-resistant coats (S).

In order to ensure a good adhesion of the particularly hard scratch-resistant coat (S) to the generally softer substrates, an intermediate coat, also known as a primer coat (P) is frequently used between the substrate and the scratch-resistant coat (S). The purpose of this primer coat (P) is to compensate for the different expansion coefficients of the substrate and the scratch-resistant coat (S) and to bring about a good adhesion of the coats to the substrate.

The primer coat (P) is intended to prevent the protective scratch-resistant coat (S) from detaching from the substrate and from cracking under environmental influences such as heat, cold, dryness, moisture, chemicals, etc.

Long-term attack by hot water is particularly critical for the scratch-resistant coat (S).

Primer coats (P) and their use in combination with siloxane-based scratch-resistant coats (S) as well as products coated with them, particularly those made from polycarbonate, are described in the following documents: DE-A 2 917 837, DE-A 2 947 823, DE-A 2 950295, DE-A 3 014 581, DE-A 3 014 772, U.S. Pat. No. 4,243,720, DE-A 3 044 804. They describe primer coats (P) that are produced by thermal and/or radiation-induced polymerisation of acrylic monomers, preferably on polycarbonate.

The acrylic monomers such as methyl methacrylate, hydroxyethyl acrylate, ethyl methacrylate, glycidyl methacrylate, methacryloxypropyl trimethoxysilane, among others, which are generally used as a mixture, are applied to the substrate diluted with organic solvents or dispersed in water by flow coating, dip coating, spraying or other conventional painting techniques and then cured by thermal or radiation-induced reaction. In this way the primer coat (P) is formed.

Using a similar method of application the siloxane-based scratch-resistant coats (S) are then applied to the primer coats (P).

DE-A 3 121 385, EP-A 0 340 565 and U.S. Pat. No. 5,041,313 describe primer coats (P) in which the final polyacrylic polymers dissolved in organic solvents or as aqueous dispersions are used instead of the acrylate monomers that still have to be polymerised. The advantage of these systems lies in the fact that only drying is required, with no reaction step. These primer coats (P) are primarily described and used in combination with special siloxane systems.

The siloxane systems belonging to the prior art are substantially thermally curing systems that preferably crosslink by condensation reaction with formation of Si-O-Si linkages. Other crosslinking mechanisms can also proceed in parallel.

Such systems are described for example in U.S. Pat. Nos. 3,790,527, 3,865,755, 3,887,514, 4,243,720, 4,278,804, 4,680,232, 4,006,271, 4,476,281, DE-A 4 001 045, U.S. Pat. No. 4,122,743, 4,020,316, 3,917,535, 3,706,714, 3,407,087, 3,836,815, 2,914,427, 3,135,241, 3,134 777, 3,100,532, 3,151,350, 3,005,541, 3,014,411, 2,834,606, 2,947,879, 3,016,021, 2,914,427 and 4,338,361.

Particularly high, glass-like scratch resistances are achieved with coatings obtainable from hydrolysable silanes containing epoxy groups, as described in U.S. Pat. No. 5,134,191, DE-A 4 020 316 and WO 98/05198.

The primer coats (P) known from the prior art, when used as an intermediate coat between the particularly scratch-resistant siloxane coats obtainable from hydrolysable silanes containing epoxy groups and a substrate, particularly polycarbonate, are not suitable to prevent the scratch-resistant coating from detaching under long-term attack by hot water (more than 4 days).

DETAILED DESCRIPTION OF THE INVENTION

The object of the present invention is therefore to provide scratch-resistant coatings comprising a primer coat (P) adhering to a substrate to be coated and a scratch-resistant coat (S) adhering to the primer coat (P), which do not display the disadvantages of the prior art. In particular the coatings should have good adhesion and be crack-resistant, chemical-resistant and extremely water-resistant in particular.

A further object of the present invention is to provide products coated with these coatings.

A particularly good adhesion to substrates of a scratch-resistant coat (S) obtainable from hydrolysable silanes containing epoxy groups is surprisingly achieved if a coat consisting of a cured epoxy resin is used as a primer coat (P) between the substrate and the scratch-resistant coat (S). Such scratch-resistant coatings are also particularly resistant to attack by hot water.

The present invention therefore provides the use of compositions containing hardeners and multi-epoxy functional compounds to produce primer coats (P) in coatings comprising these primer coats (P) and a scratch-resistant coat (S) adhering to the primer coat (P), whereby the scratch-resistant coat (S) is obtainable from hydrolysable silanes containing epoxy groups.

The present invention further provides a coating comprising a primer coat (P) adhering to a substrate to be coated and a scratch-resistant coat (S) adhering to the primer coat (P), characterised in that the primer coat (P) contains a cured epoxy resin obtainable from hardeners and multi-epoxy functional compounds, and that the scratch-resistant coat (S) is obtainable from hydrolysable silanes containing epoxy groups.

A preferred embodiment of the present invention is a coating according to the invention, whereby the hardener is selected from the group consisting of amines, anhydrides and mixtures of the two and whereby the multi-epoxy functional compounds are selected from the group consisting of aromatic glycidyl compounds, cycloaliphatic glycidyl compounds, heterocyclic glycidyl compounds, cycloaliphatic and aliphatic epoxy compounds and mixtures of these compounds that can serve as educts for epoxy resins, and whereby the hydrolysable silanes containing epoxy groups are selected from the group consisting of compounds having the general formulae (I) or (II):

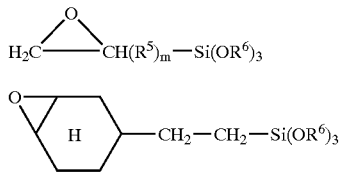

whereby in both cases $R^5$ is a divalent hydrocarbon radical with a maximum of 9 carbon atoms or a divalent radical with a maximum of 9 carbon atoms, consisting of C, H and O atoms, whereby the O atom is present as an ether bond radical, and $R^6$ is an aliphatic hydrocarbon radical with a maximum of 4 carbon atoms, an acyl radical with a maximum of 4 carbon atoms or a radical having the formula $(CH_2CH_2O)_nZ$, in which n is at least 1 and Z denotes an aliphatic hydrocarbon radical with a maximum of 4 carbon atoms, and m is equal to 0 or 1, compounds having the general formula (III)

$$R_3SiR' \quad (III)$$

in which

R are the same or different and stand for a hydrolysable group and

R' represents a glycidyl or glycidyloxy-$(C_{1-20})$ alkylene radical and mixtures of these compounds.

Particularly preferred is such a coating whereby the multi-epoxy functional compounds are cycloaliphatic epoxy compounds that can serve as educts for cycloaliphatic epoxy resins.

A preferred embodiment of the present invention is further given by a coating according to the invention, whereby the hardener is selected from the group consisting of amines, anhydrides and mixtures of the two and whereby the multi-epoxy functional compound is selected from the group consisting of bisphenol-A diglycidyl ethers having the following formula

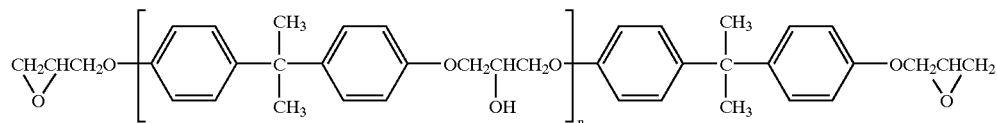

whereby n=0 to 30, 3,4-epoxycyclohexane carboxylic acid-3,4'-epoxycyclohexylmethyl ester having the following formula

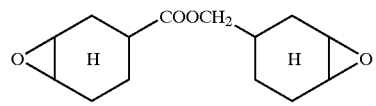

bis(3,4-epoxycyclohexylmethyl) adipate having the following formula

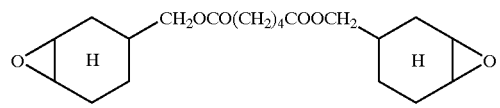

3-(3,4'-epoxycyclohexyl)-2,4-dioxaspiro[5,5]-8,9-epoxy undecane having the following formula

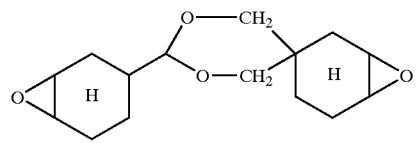

and mixtures thereof, and whereby the hydrolysable silanes containing epoxy groups are selected from the group consisting of 3-glycidyl oxypropyl trimethoxysilane and 2-(3,4-epoxycyclohexyl) ethyl trimethoxysilane and whereby the scratch-resistant coat (S) additionally contains a particulate material selected from the group consisting of oxide or oxide hydrate of Si, Al, Ti, Zr, Zn, Sn or Ce with a particle size in the range from 2 to 50 nm and whereby additionally compounds (C) selected from the group consisting of $Si(OCH_3)_4$, $Si(OC_2H_5)_4$, $CH_3$-Si$(OC_2H_5)_3$, $(CH_3)_2Si(OCH_3)_2$ and $(CH_3)_2Si(OC_2H_5)_2$ are used to produce the scratch-resistant coat (S) and whereby additionally a compound (D) selected from the group consisting of aluminium trimethoxyethanolate, aluminium triisopropoxyethanolate, aluminium triethoxyethanolate and aluminium tris(n-butoxyethanolate) is used to produce the scratch-resistant coat (S).

A further preferred embodiment of the present invention is a coating according to the invention whereby the scratch-resistant coat (S) additionally contains a particulate material having a particle size from 1 to 100 nm.

The present invention further provides coated products containing a coating according to the invention and a substrate.

Coated products containing a coating according to the invention and a substrate containing wood, textiles, paper, stoneware, metals, glass, ceramics or plastics are preferred. Polycarbonate is particularly preferred.

Sheets, spectacles, optical lenses, car windows or plastic headlamp diffusers containing a product coated according to the invention are a preferred embodiment of the present invention.

The coatings according to the invention have many advantages. They are very resistant to hydrolysis and very scratch-resistant.

The primer coat (P) according to the invention contains a cured epoxy resin and has a coating thickness of preferably below 50 μm, particularly preferably below 15 μm, most particularly preferably below 1 μm.

The primer coat (P) is obtainable by crosslinking multi-epoxy functional compounds, hereinafter referred to as epoxy compounds, with so-called hardeners, also known as curing agents or crosslinking agents.

These multi-epoxy functional compounds and hardeners together with their manufacture and use are described, for example, in: Kunststoff Handbuch, Volume 10, Duroplaste, edited by: Prof. Dr. Wilbrand Woebcken, Carl Hanser Verlag, 1988 and in Kunststoff-Handbuch Volume XI, Polyacetale, Epoxidharze, fluorhaltige Polymerisate, Silicone usw., edited by: Prof. Vieweg, Dr. Reiher, Dr. Scheurlen, Carl Hanser Verlag, Munich, 1971 and in Epoxy-Resins, Chemistry and Technology, edited by Clayton A. May, Yoshio Tanaka, Marcel Dekker Inc., New York, 1973.

Epoxy compounds can be produced by known methods such as are described below, for example. They are generally produced by reaction from substances with an active hydrogen and epichlorohydrin with subsequent dehydrohalogenation according to the following scheme:

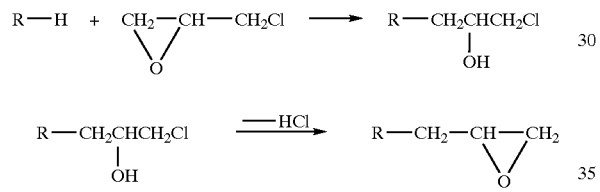

or by direct epoxidation of olefins by per-acids:

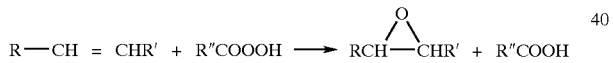

A detailed manufacturing process with reference to primary literature can be found in Encyclopedia of Polymer Science and Engineering, $2^{nd}$ Edition, Volume 6, pages 322 to 382, John Wiley & Sons, or in Encyclopedia of Chemical Technology, Fourth Edition, Volume 9, pages 730 to 755, or in Ullmanns Enzyklopädie der technischen Chemie, Third Edition, Volume 8, pages 431 to 437, Urban & Schwarzenberg, Munich/Berlin, or in Ullmann's Encyclopedia of Industrial Chemistry, Fifth Edition, Volume A9, pages 531 to 563, VCH Verlagsgesellschaft mbH, D-6940 Weinheim.

Aromatic glycidyl compounds can be used as epoxy compounds, for example. Examples include:
bisphenol-A-diglycidyl ether having the following formula

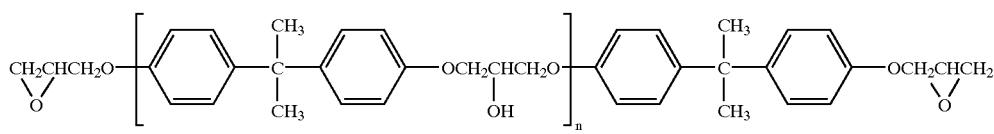

whereby
n=0 for pure product
n=0 to 15 for technical product and
n=around 2 or around 4 or around 12 for so-called technical advancement products;
tetrabromobisphenol-A-diglycidyl ether (bromine content in technical product around 47 to 50 wt. %) having the following formula

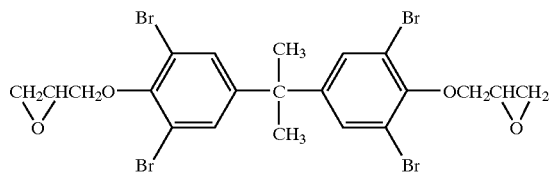

phenol novolack glycidyl ether having approximately the following formula

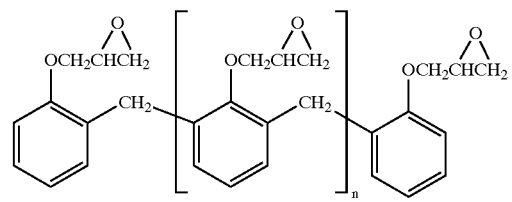

whereby n is between 0.2 and 1.4 for technical products, cresol novolack glycidyl ether having approximately the following formula

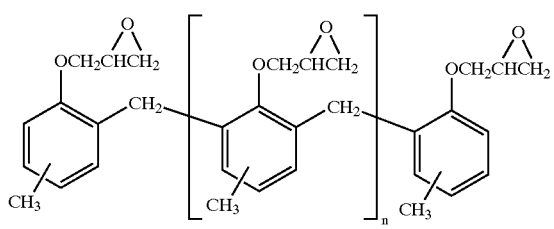

whereby n is between 1.0 and 4.0 for technical products, bisphenol-F-diglycidyl ether (sold as a mixture of isomers) with the following components

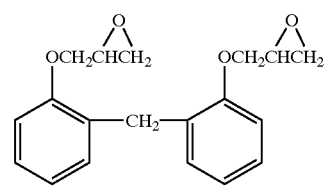

(10 to 15 wt. %)

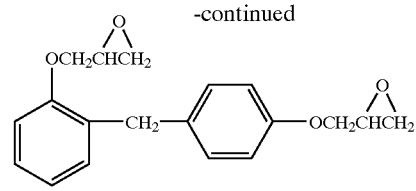

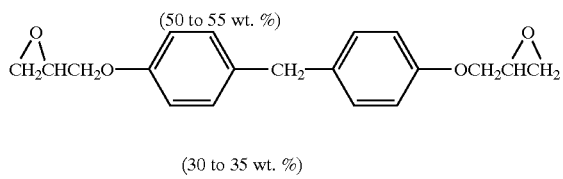

(50 to 55 wt. %)

(30 to 35 wt. %)

whereby the total adds up to 100 wt. %;
glyoxal tetraphenol tetraglycidyl ether having the following idealised formula (containing by-products),

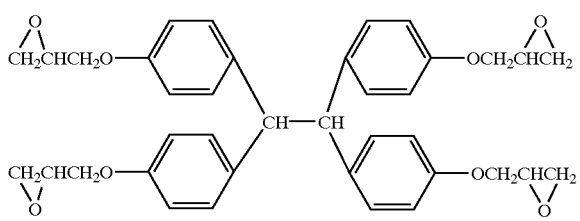

N,N-diglycidyl aniline having the following formula

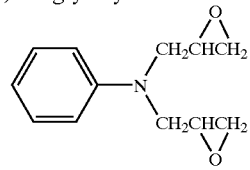

p-aminophenol triglycide having the following formula

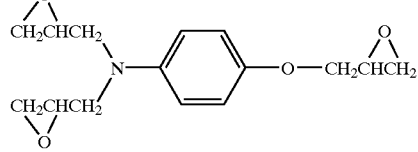

4,4'-diaminodiphenyl methane tetraglycide having the following formula

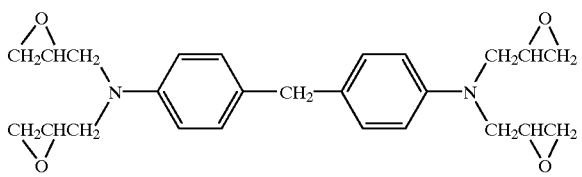

Cycloaliphatic glycidyl compounds can also be used as epoxy compounds, for example. Examples include:
tetrahydrophthalic acid diglycidyl ester having the following formula

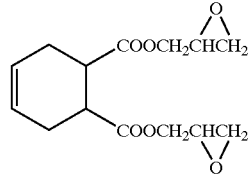

hexahydrophthalic acid diglycidyl ester having the following formula

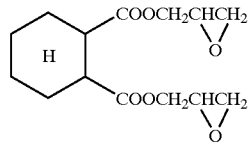

hydrogenated bisphenol-A-diglycidyl ether having the following formula

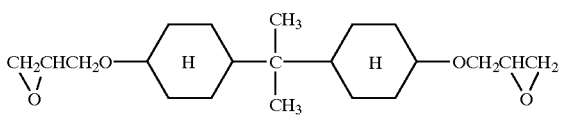

Heterocyclic glycidyl compounds can also be used as epoxy compounds, for example. Examples include:
triglycidyl isocyanurate having the following formula

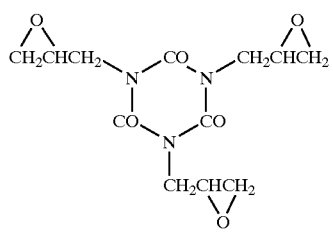

triglycidyl-bis-hydantoin having the following formula

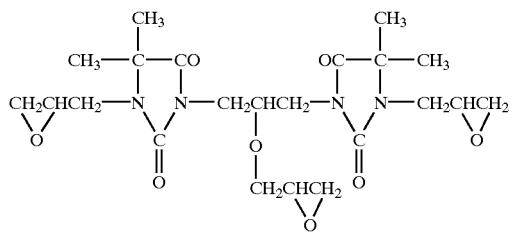

Cycloaliphatic epoxy compounds that can serve as educts for cycloaliphatic epoxy resins can also be used as epoxy compounds, for example. Examples include:
3,4-epoxycyclohexane carboxylic acid-3,4'-epoxycyclohexylmethyl ester having the following formula

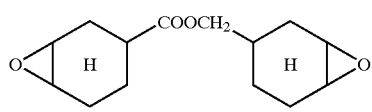

bis(3,4-epoxycyclohexylmethyl) adipate having the following formula

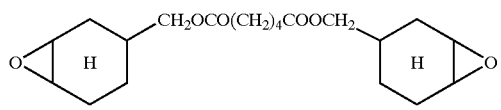

3-(3,4'-epoxycyclohexyl)-2,4-dioxaspiro[5,5]-8,9-epoxy undecane having the following formula

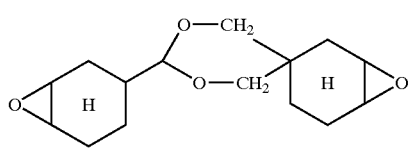

Aliphatic epoxy compounds that can serve as educts for aliphatic epoxy resins can also be used as epoxy compounds, for example. Examples include:

butane-1,4-diol-diglycidyl ether having the following formula

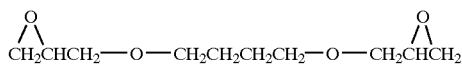

polypropylene glycol-425-diglycidyl ether having the following formula

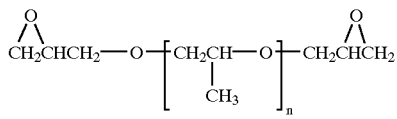

whereby n has a value such that an average molecular weight of 425 g/mol (number-average) is produced.

All epoxy compounds that can be used according to the invention have at least two epoxy groups.

Particularly preferred epoxy compounds are those that display no aromatic structures. Most particularly preferred are cycloaliphatic epoxy compounds that can serve as educts for cycloaliphatic epoxy resins. They deliver coatings that are particularly resistant to UV radiation. Their manufacture is described for example in Encyclopedia of Polymer Science and Engineering, Volume 6, page 336, John Wiley & Sons and in U.S. Pat. No. 2,716,123.

Anhydrides such as e.g. phthalic anhydride, tetrahydro, hexahydro, methyl tetrahydro, endomethylene tetrahydro, methyl endomethylene tetrahydro phthalic anhydride, pyromellitic, trimellitic, benzophenone tetracarboxylic anhydride, maleic anhydride/styrene copolymers or dodecenyl succinic anhydride can for example be used as hardeners.

Amines such as e.g. aromatic amines, cycloaliphatic amines, aliphatic amines such as e.g. 4,4'-diaminodiphenyl methane, o,o'-alkyl-substituted derivatives thereof, 4,4'-diaminodiphenyl ether, 4,4'-diaminodiphenyl sulfone, 2,4-diamino-3,5-diethyl toluene, hydrogenated 4,4'-diaminodiphenyl methane, isophorone diamine, diethylene triamine, triethylene tetramine, polyaminoamides based on diethylene triamine or similar amines and fatty acids can also be used as hardeners.

Chain extension components (preferably phenols), polymerisation initiators, polyaddition catalysts, flexibilisers and impact modifiers as known from the cited literature can additionally be used in the primer coat (P).

The primer coat (P) can also contain conventional additives such as e.g. dyestuffs, flow-control agents, reactive thinners, inorganic or organic fillers and stabilisers, particularly UV stabiliser systems and infrared absorbers.

Hardeners and epoxy compounds can be used for example as aqueous dispersions or in organic solvents. Preferred organic solvents are alcohols, particularly isopropanol, ethanol, isopropyl glycol, butyl glycol, 4-hydroxy-4-methyl-2-pentanone or mixtures thereof. 4-hydroxy-4-methyl-2-pentanone is most particularly preferred.

The use of pre-crosslinked products in this connection has been found to be particularly favourable for ease of use. This means that the epoxy compounds have already been reacted with a portion of the hardener and the hardener already reacted with a portion of the epoxy compound. The final cure is then achieved by mixing the two components at elevated temperature.

Hardeners and pre-crosslinked epoxy compounds are available e.g. from Ciba Spezialitätenchemie GmbH, D-79664 Wehr, Germany, under the name Araldite® and hardeners as two-component systems for coating the most diverse substrates.

In order to apply the primer coat (P) to the particular substrate, the surface of the substrate is conventionally first cleaned. In the case of plastic components, rinsing with ethanol or isopropanol or cleaning in warm surfactant-containing water in ultrasonic baths have proven their merit.

After blowing off with ionised air (to prevent electrostatic attraction of dust; see Brock, Thomas: Lehrbuch der Lacktechnologie, Vincentz Verlag, Hanover 1998) the thinned one-component composition containing epoxy compounds and hardeners is applied to the substrate by dip coating, flow coating, spraying, spin coating or other painting techniques. In this way the primer coat (P) is formed.

The coating thickness is regulated by the dilution (preferably 2 to 35 wt. % solids content) and the painting parameters. The primer coat (P) is preferably allowed to dry at room temperature (20 to 23° C.) until it is dust dry. Final crosslinking is then performed at higher temperatures, preferably at 90 to 130° C.

The scratch-resistant coat (S) is then applied to this primer coat (P).

The scratch-resistant coat (S) according to the invention is obtainable from hydrolysable silanes containing epoxy groups, preferably in combination with particulate materials having a particle size from 1 to 100 nm, preferably 2 to 50 nm.

According to the invention the term hydrolysable silanes containing epoxy groups, also known as epoxy silanes, refers to compounds that on the one hand possess at least one epoxy ring and at the same time display groups that form silanol structures under hydrolysis conditions.

Epoxy silanes such as are preferably used according to the invention are described for example in U.S. Pat. No. 2,946,701. These are compounds having the general formulae (I) or (II):

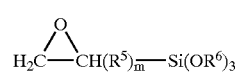 (I)

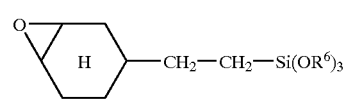 (II)

whereby in both cases $R^5$ is a divalent hydrocarbon radical with a maximum of 9 carbon atoms or a divalent radical with a maximum of 9 carbon atoms, consisting of C, H and O atoms, whereby the O atom is present as an ether bond radical, preferably —$CH_2OCH_2CH_2CH_2$—, and $R^6$ is an aliphatic hydrocarbon radical with a maximum of 4 carbon atoms, an acyl radical with a maximum of 4 carbon atoms or a radical having the formula (CH$_2$CH$_2$O)$_n$Z, in which n is at least 1 and Z denotes an aliphatic hydrocarbon radical with a maximum of 4 carbon atoms, and m is 0 or 1.

The production of these epoxy silanes is likewise described in U.S. Pat. No. 2,946,701. Particularly preferred epoxy silanes are such compounds in which R$^6$ is methyl or ethyl. They are available commercially, inter alia from the companies Union Carbide Corp., 39 Old Ridgebury Rd., Danbury, Conn. 06817-0001, USA and Sivento Chemie GmbH, Parsevalstr. 9A, D-40468 Düsseldorf, Germany, as:

A-187 or Dynasilan Glymo, in other words 3-glycidyl oxypropyl trimethoxysilane, or A-186, in other words 2-(3,4-epoxycyclohexyl) ethyl trimethoxysilane.

Further scratch-resistant coats (S) that are preferred according to the invention are described below.

U.S. Pat. No. 5,134,191 discloses a scratch-resistant coat (S) that can be obtained from epoxy group-containing organic silicon compound and inorganic submicron particles, i.e. with a particle size of less than 1 μm, such as silica sol, for example, and that can be cured with a minimal quantity of an antimony compound as curing catalyst. It can be used as a coating film for plastic articles used in optics, for example. The composition can optionally also contain an aluminium compound.

A composition with even further improved scratch resistance, adhesion, paint viscosity and elasticity, which in comparison to the other compositions of the prior art displays a low turbidity and tendency to gel, is described in WO 98/05197.

A further scratch-resistant coat (S) that is preferred according to the invention is obtainable from at least one silicon compound (A) displaying at least one epoxy group-containing radical that is not separable by hydrolysis and is bonded directly to silicon, a particulate material (B) selected from oxides, oxide hydrates, nitrides and carbides of silicon, aluminium and boron and of transition metals and displaying a particle size in the range from 1 to 100 nm, a compound (C) of silicon, titanium, zirconium, boron, tin or vanadium and at least one hydrolysable compound (D) of titanium, zirconium or aluminium, characterised in that they are present in the following ratio:

1 mol of silicon compound (A), 0.42 to 0.68 mol of particulate material (B), 0.28 to 1.0 mol of compound (C) and 0.23 to 0.68 mol of compound (D).

These compositions that are characterised by specific proportions of the components used produce highly scratch-resistant coats (S).

They demonstrate a markedly extended pot life.

In order to obtain a rapid crosslinking of the scratch-resistant coat (S), a Lewis base (E) can additionally be used as catalyst.

A hydrolysable silicon compound (F) with at least one non-hydrolysable radical that preferably displays 5 to 30 fluorine atoms bonded directly to carbon atoms, whereby these carbon atoms are separated by at least 2 atoms of silicon, can additionally be used. The use of a fluorinated silane of this type additionally gives the corresponding scratch-resistant coat (S) hydrophobic and dirt-repellent properties.

A surfactant (T), preferably non-ionic, can additionally be used to obtain long-term hydrophilic properties and/or an aromatic polyol (H) to obtain corrosion-inhibiting properties (increased resistance to condensation).

Components A, B, C, D, E, F, T and H are described in greater detail below. Preferences in terms of the present invention are also indicated.

The silicon compound (A) is a silicon compound having 2 or 3, preferably 3, hydrolysable radicals and one or 2, preferably one, non-hydrolysable radical. The single non-hydrolysable radical, or at least one of the two, has an epoxy group.

Examples of the hydrolysable radicals include halogen (F, Cl, Br and I), particularly Cl and Br, alkoxy (particularly C$_{1-4}$ alkoxy, such as e.g. methoxy, ethoxy, n-propoxy, i-propoxy and n-butoxy, i-butoxy, sec-butoxy and tert-butoxy), aryloxy (particularly C$_{6-10}$ aryloxy, e.g. phenoxy), acyloxy (particularly C$_{1-4}$ acyloxy, such as e.g. acetoxy and propionyloxy) and alkyl carbonyl (e.g. acetyl).

Particularly preferred hydrolysable radicals are alkoxy groups, particularly methoxy and ethoxy.

Examples of non-hydrolysable radicals with no epoxy group are hydrogen, alkyl, particularly C$_{1-4}$ alkyl (such as e.g. methyl, ethyl, propyl and butyl), alkenyl (particularly C$_{2-4}$ alkinyl, such as e.g. vinyl, 1-propenyl, 2-propenyl and butenyl), alkinyl (particularly C$_{2-4}$ aryl, such as e.g. phenyl and naphthyl), whereby the above-mentioned groups can optionally display one or more substituents, such as e.g. halogen and alkoxy. Methacrylic and methacryloxypropyl radicals are also examples of non-hydrolysable radicals.

Examples of non-hydrolysable radicals with an epoxy group are particularly those that have a glycidyl or glycidyloxy group.

Examples of these silicon compounds (A) that can be used according to the invention can be found on pages 8 and 9 of EP-A 0 195 493.

Particularly preferred silicon compounds (A) according to the invention are those having the general formula $$R_3SiR' \quad\quad\quad (III)$$

in which

R are the same or different, preferably the same, and stand for a hydrolysable group, preferably C$_{1-4}$ alkoxy and particularly methoxy or ethoxy, and R' represents a glycidyl or glycidyloxy-(C$_{1-20}$) alkylene radical, particularly β-glycidyloxyethyl, γ-glycidyloxypropyl, δ-glycidyloxybutyl, ε-glycidyloxypentyl, ω-glycidyloxyhexyl, ω-glycidyloxyoctyl, ω-glycidyloxynonyl, ω-glycidyloxydecyl, ω-glycidyloxydodecyl and 2-(3,4-epoxycyclohexyl) ethyl.

Given its ready availability, γ-glycidyloxypropyl trimethoxysilane (abbreviated below to GPTS) is particularly preferably used according to the invention.

The particulate material (B) according to the invention is an oxide, oxide hydrate, nitride or carbide of Si, Al or B or of transition metals, preferably Ti, Zr and Ce, with a particle size in the range from 1 to 100 nm, preferably 2 to 50 nm and particularly preferably 5 to 20 nm.

This material can be used in the form of a powder, but is preferably used in the form of a sol (particularly an acid-stabilised sol). Preferred particulate materials are boehmite, CeO$_2$, ZrO$_2$ and TiO$_2$ as well as titanium nitride.

Nanoscale boehmite particles with a particle size in the range from 1 to 100, preferably 2 to 50 nm and particularly preferably 5 to 20 nm, are particularly preferred.

The particulate materials are available commercially in the form of powders and their use to manufacture (acid-stabilised) sols is likewise known from the prior art. Reference can also be made to the manufacturing examples provided below.

Boehmite sol with a pH in the range from 2.5 to 3.5, preferably 2.8 to 3.2, which can be obtained for example by suspending boehmite powder in dilute HCl, is particularly preferably used.

Varying the nanoscale particles is generally accompanied by a variation in the refractive index of the corresponding materials. Thus, for example, replacing boehmite particles with $ZrO_2$ or $TiO_2$ particles produces materials with higher refractive indices, whereby the refractive index is calculated additively from the volume of the highly refractive component and the matrix using the Lorentz-Lorenz equation.

The hydrolysable compounds (C) according to the invention are described below.

In addition to the silicon compounds (A), other hydrolysable compounds (C) of elements from the group Si, Ti, Zr, Al, B, Sn and V are also used to produce the scratch-resistant coats (S) and are preferably hydrolysed together with the silicon compound (A) or the silicon compounds (A).

The compounds (C) are compounds of Si, Ti, Zr, Al, B, Sn or V having the general formula (IV) or (V)

$$R_x M^{+4} R'_{4-x} \quad (IV)$$

$$R_x M^{+3} R'_{3-x} \quad (V)$$

whereby

M represents a) $Si^{+4}$, $Ti^{+4}$, $Zr^{+4}$, $Sn^{+4}$ or b) $Al^{+3}$, $B^{+3}$ or $(VO)^{+4}$, R represents a hydrolysable radical, R' represents a non-hydrolysable radical and x can be 1 to 4 in the case of tetravalent metal atoms M (case a) and 1 to 3 in the case of trivalent metal atoms M (case b).

If several radicals R and/or R' are present in a compound (C), then in each case these can be the same or different. Preferably x is greater than 1. This means that the compound (C) displays at least one, preferably several, hydrolysable radicals.

Examples of the hydrolysable radicals are halogen (F, Cl, Br and I), particularly Cl and Br, alkoxy, particularly $C_{1-4}$ alkoxy, such as e.g. methoxy, ethoxy, n-propoxy, i-propoxy and n-butoxy, i-butoxy, sec-butoxy or tert-butoxy, aryloxy, particularly $C_{6-10}$ aryloxy, e.g. phenoxy, acyloxy, particularly $C_{1-4}$ acyloxy, such as e.g. acetoxy and propionyloxy, and alkyl carbonyl, e.g. acetyl. Particularly preferred hydrolysable radicals are alkoxy groups, particularly methoxy and ethoxy.

Examples of non-hydrolysable radicals are hydrogen, alkyl, particularly $C_{1-4}$ alkyl, such as e.g. methyl, ethyl, propyl and n-butyl, i-butyl, sec-butyl and tert-butyl, alkenyl, particularly $C_{2-4}$ alkenyl, such as e.g. vinyl, 1-propenyl, 2-propenyl and butenyl, alkinyl, particularly $C_{2-4}$ alkinyl, such as e.g. acetylenyl and propargyl, and aryl, particularly $C_{6-10}$ aryl, such as e.g. phenyl and naphthyl, whereby the above-mentioned groups can optionally display one or more substituents, such as e.g. halogen and alkoxy. Methacrylic and methacryloxypropyl radicals are also non-hydrolysable radicals.

Examples of compounds (C) that can be used according to the invention are given below.

$Si(OCH_3)_4$, $Si(OC_2H_5)_4$, $Si(O\text{-n-}$ or $\text{i-}C_3H_7)_4$, $Si(OC_4H_9)_4$, $SiCl_4$, $HSiCl_3$, $Si(OOCCH_3)_4$, $CH_3$—$SiCl_3$, $CH_3$—$Si(OC_2H_5)_3$, $C_2H_5$—$SiCl_3$, $C_2H_5$—$Si(OC_2H_5)_3$, $C_3H_7$—$Si(OCH_3)_3$, $C_6H_5$—$Si(OCH_3)_3$, $C_6H_5$—$Si(OC_2H_5)_3$, $(CH_3O)_3$—$Si$—$C_3H_6$—$Cl$, $(CH_3)_2SiCl_2$, $(CH_3)_2Si(OCH_3)_2$, $(CH_3)_2Si(OC_2H_5)_2$, $(CH_3)_2Si(OH)_2$, $(C_6H_5)_2SiCl_2$, $(C_6H_5)_2Si(OCH_3)_2$, $(C_6H_5)_2Si(OC_2H_5)_2$, $(i$—$C_3H_7)_3SiOH$, $CH_2$=$CH$—$Si(OOCCH_3)_3$, $CH_2$=$CH$—$SiCl_3$, $CH_2$=$CH$—$Si(OCH_3)_3$, $CH_2$=$CH$—$Si(OC_2H_5)_3$, $CH_2$=$CH$—$Si(OC_2H_4OCH_3)_3$, $CH_2$=$CH$—$CH_2$—$Si(OCH_3)_3$, $CH_2$=$CH$—$CH_2$—$Si(OC_2H_5)_3$, $CH_2$=$CH$—$CH_2$—$Si(OOCCH_3)_3$, $CH_2$=$C(CH_3)$—$COO$—$C_3H_7Si(OCH_3)_3$, $CH_2$=$C(CH_3)$—$COO$—$C_3H_7Si(OC_2H_5)_3$, $Al(OCH_3)_3$, $Al(OC_2H_5)_3$, $Al(O$—$n$—$C_3H_7)_3$, $Al(O$—$i$—$C_3H_7)_3$, $Al(OC_4H_9)_3$, $Al(O$—$i$—$C_4H_9)_3$, $Al(O$—$sec$—$C_4H_9)_3$, $AlCl_3$, $AlCl(OH)_2$, $Al(OC_2H_4OC_4H_9)_3$, $TiCl_4$, $Ti(OC_2H_5)_4$, $Ti(OC_3H_7)_4$, $Ti(O$—$i$—$C_3H_7)_4$, $Ti(OC_4H_9)_4$, $Ti(2\text{-ethylhexoxy})_4$, $ZrCl_4 Zr(OC_2H_5)_4$, $Zr(OC_3H_7)_4$, $Zr(O$—$i$—$C_3H_7)_4$, $Zr(OC_4H_9)_4$, $ZrOCl_2$, $Zr(2\text{-ethylhexoxy})_4$, together with Zr compounds displaying complexing radicals, such as e.g. $\mu$-diketone and methacrylic radicals, $BCl_3$, $B(OCH_3)_3$, $B(OC_2H_5)_3$, $SnCl_4$, $Sn(OCH_3)_4$, $Sn(OC_2H_5)_4$, $VOCl_3$, $VO(OCH_3)_3$.

$SiR_4$ compounds are particularly preferably used, whereby the radicals R can be the same or different and stand for a hydrolysable group, preferably for an alkoxy group with 1 to 4 carbon atoms, particularly for methoxy, ethoxy, n-propoxy, i-propoxy, n-butoxy, i-butoxy, sec-butoxy or tert-butoxy.

As can be seen, these compounds (C) (particularly the silicon compounds) can also have non-hydrolysable radicals displaying a C—C double or triple bond. If such compounds are used in conjunction with the silicon compounds (A), monomers preferably containing epoxy groups or acrylate groups, such as e.g. meth(acrylates), can additionally also be used in the composition serving to produce the scratch-resistant coat (S). These monomers can naturally also have two or more functional groups of the same type, such as e.g. poly(meth)acrylates of organic polyols. The use of organic polyepoxies is likewise possible. If curing of the corresponding composition is induced thermally or photochemically, polymerisation of the organic species also occurs in addition to construction of the organically modified inorganic matrix, causing the crosslinking density and hence also the hardness of the corresponding coatings and coated products to increase.

The compound (D) is preferably a compound of Ti, Zr or Al having the following general formula (VI)

$$M(R''')_m \quad (VI)$$

wherein

M stands for Ti, Zr or Al and

R''' can be the same or different and stand for a hydrolysable group and The present invention provides a coating which contains a primer layer on a substrate with a scratch resistant layer adhered to the primer, wherein the primer layer contains a hardened epoxy resin prepared from a hardener and a multi epoxy-functional compound and the scratch resistant layer contains an epoxide group containing hydrolyzable silane. The coating may find use in coated products such as sheets, spectacles, optical lenses, automobile screens and plastic spray screens.

m equals 4 (M=Ti, Zr) or 3 (M=Al).

Examples of hydrolysable groups R'" are halogen (F, Cl, Br and I, particularly Cl and Br), alkoxy (particularly $C_{1-6}$ alkoxy, such as e.g. methoxy, ethoxy, n-propoxy, i-propoxy and n-butoxy, i-butoxy, sec-butoxy or tert-butoxy, n-pentyloxy, n-hexyloxy), aryloxy (particularly $C_{6-10}$ aryloxy, e.g. phenoxy), acyloxy (particularly $C_{1-4}$ acyloxy, such as e.g. acetoxy and propionyloxy) and alkylcarbonyl (e.g. acetyl), or a $C_{1-6}$-alkoxy-$C_{2-3}$ alkyl group, i.e. a group derived from $C_{1-6}$ alkylethylene glycol or $C_{1-6}$ alkylpropylene glycol, whereby alkoxy has the same meaning as given above.

Particularly preferably M equals aluminium and R'" equals alkoxy ethanolate, particularly methoxy ethanolate, isopropoxy ethanolate, ethoxy ethanolate or n-butoxy ethanolate.

The Lewis base (E) is preferably a nitrogen compound. Such nitrogen compounds can be selected e.g. from N-heterocyclene, amino group-containing phenols, polycyclic amines and ammonia (preferably as an aqueous solution).

Examples include 1-methyl imidazole, 2-(N,N-dimethyl aminomethyl) phenol, 2,4,6-tris(N,N-dimethyl aminomethyl) phenol and 1,8-diazabicyclo[5.4.0]-7-undecene. Particularly preferred amongst these compounds is 1-methyl imidazole.

A further class of nitrogen-containing Lewis bases that can be used according to the invention are hydrolysable silanes with at least one non-hydrolysable radical comprising at least one primary, secondary or tertiary amino group. Such silanes can be hydrolysed together with the silicon compound (A) and they then represent a Lewis base incorporated into the organically modified inorganic network.

Preferred nitrogen-containing silicon compounds are those having the general formula (VII)

$$R^3SiR''\quad\quad (VII)$$

where the radicals R are the same or different, preferably the same, and stand for a hydrolysable group, preferably $C_{1-4}$ alkoxy and particularly methoxy and ethoxy, and R" stands for a non-hydrolysable radical bonded to Si, that comprises at least one primary, secondary or tertiary amino group.

Examples of such silanes are 3-aminopropyl trimethoxysilane, 3-aminopropyl triethoxysilane, N-(2-aminoethyl)-3-aminopropyl trimethoxysilane, N-[N'-2'-aminoethyl)-2-aminoethyl]3-aminopropyl trimethoxysilane and N-[3-(triethoxysilyl) propyl]-4,5-dihydroimidazole.

The Lewis base (E) is generally used in the corresponding compositions in a quantity of 0.01 to 0.5 mol per mol of epoxy group of the silicon compound (A). Quantities in the range from 0.02 to 0.3 mol, and particularly 0.05 to 0.1 mol of Lewis base (E) per mol of epoxy group, are preferred.

The hydrolysable fluorinated silanes (F) that can additionally be used are those that have at least one non-hydrolysable radical displaying 5 to 30 fluorine atoms bonded to carbon atoms that are separated by at least two atoms of Si. Such silanes are described in detail in DE-A 41 18 184. Examples include the following:

$C_2F_5CH_2\text{—}CH_2\text{—}SiY_3$,
n—$C_6F_{13}CH_2\text{—}CH_2\text{—}SiY_3$,
n—$C_8F_{17}CH_2\text{—}CH_2\text{—}SiY_3$,
n—$C_{10}F_{21}CH_2\text{—}CH_2\text{—}SiY_3$,
(Y =$OCH_3$, $OC_2H_5$ or Cl)
i—$C_3F_7O\text{—}(CH_2)_3\text{—}SiCl_2(CH_3)$
n—$C_6F_{13}CH_2\text{—}CH_2\text{—}SiCl_2(CH_3)$,
n—$C_6F_{13}CH_2\text{—}CH_2\text{—}SiCl_2(CH_3)_2$.

These fluorinated silanes are preferably used in a quantity of 0.1 to 15 wt. %, by preference 0.2 to 10 wt. % and particularly preferably 0.5 to 5 wt. %, relative to the composition serving to produce the scratch-resistant coat (S).

The surfactant (G) that can be used to obtain a long-term anti-fogging effect and to increase the hydrophilia of the coatings is preferably a non-ionic surfactant. Non-ionic surfactants that are liquid at room temperature are particularly preferred. These surfactants can not only be used during production of the compositions, they can also be thermally diffused into the compositions subsequently at approx. 50 to 60° C. This is preferably achieved from an aqueous solution. Preferred surfactants are polyoxyathylenoyl ethers of varying chain length (e.g. Brij® 92, 96 or 98 from ICI Surfactants, Deutsche ICI GmbH site, Goldschmidtstraße 100, D-45127 Essen, Germany), polyoxyethylene ethyl ethers of varying chain length (e.g. Malipal™24/30 to 24/100 from Sivento Chemie GmbH, Parsevalstraße 9A, D-40468 Düsseldorf, Germany) and Disponil® 05 from Henkel), sodium lauryl sulfate (e.g. Sulfopon® 101 Spezial from Henkel KGaA, Henkelstratße 67, D-40191 Düsseldorf, Germany), lauryl pyridinium chloride (e.g. Dehydquad C Christ® from Riedel de Haen AG, Wunstorfer Straße 40, D-30926 Seelze, Germany).

The surfactant is preferably used in quantities of 0.1 to 35 wt. %, relative to the coating composition.

The aromatic polyol (H) that is optionally used preferably displays an average molecular weight of a maximum of 1000. Examples of such polyols are, for example, polyphenylene ethers carrying hydroxyl groups on at least 2 of the phenyl rings, and oligomers in which aromatic rings are bonded together by means of a single bond, —O—, —CO—, $SO_2$— or similar and which preferably display at least 2 hydroxyl groups bonded to aromatic groups.

Particularly preferred aromatic polyols are aromatic diols. Particularly preferred among these are compounds with the following general formulae (VIII) and (IX)

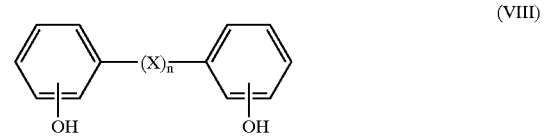
(VIII)

(IX)

whereby in both cases

X stands for a ($C_1$ to $C_8$ alkylene or ($C_1$ to $C_8$) alkylidene radical, a ($C_6$ to $C_{14}$) arylene radical, —O—, —S—, —CO—or —$SO_2$—and n is equal to 0 or 1.

X is preferably equal to ($C_1$ to $C_4$) alkylene or ($C_1$ to $C_4$) alkylidene, particularly —$C(CH_3)_2$—and —$SO_2$—.

The aromatic rings of the compounds can also carry, in addition to the OH groups, up to 3 or 4 further substituents such as e.g. halogen, alkyl and alkoxy.

Examples of aromatic polyols (H) that can be used are bisphenol A, 4,4'-dihydroxydiphenyl sulfone and 1,5-dihydroxynaphthaline, with bisphenol A being preferred.

The polyol (H) is preferably used in amounts such that per mol of epoxy ring of the silicon compound (A), 0.2 to 1.5 mol, particularly preferably 0.3 to 1.2 and most particularly preferably 0.6 to 1.0 mol of hydroxyl groups of the aromatic polyol (H) are present.

The use of silicon compounds (A) with at least two epoxy groups results in coatings and coating products with improved resistance to condensation.

The compositions that serve to produce the scratch-resistant coat (S) are preferably obtained by a method described in greater detail below, in which a sol of the material (B) with a pH in the range from 2.5 to 3.5, preferably 2.8 to 3.2, is reacted with a mixture of the other components.

It is essential for the composition that the amounts of the components used lie within the specified ranges. It has been demonstrated that under this condition compositions can be obtained that display markedly improved scratch resistance, adhesion, paint viscosity, gel times, turbidity and elasticity.

The hydrolysable silicon compound (A) can optionally be prehydrolysed together with the compound (C) using an acid catalyst (preferably at room temperature, i.e. 20 to 23° C.) in aqueous solution, whereby preferably around half a mol of water is used per mol of hydrolysable group. Hydrochloric acid is preferably used as catalyst for the prehydrolysis.

The particulate material (B) is preferably suspended in water and the pH adjusted to 2.5 to 3, preferably 2.8 to 3.2. Hydrochloric acid is preferably used for acidification.

If boehmite is used as the particulate material (B), it forms a clear sol under these conditions.

The compound (C) is mixed with the compound (A). The first partial portion of the particulate material (B) suspended as described above is then added. The quantity is preferably chosen such that the water contained within it is sufficient to bring about the half-stoichiometric hydrolysis of compounds (A) and (C). It makes up 10 to 70 wt. % of the total quantity, preferably 20 to 50 wt. %.

The reaction course is slightly exothermic. After the first exothermic reaction has died down, the temperature is adjusted to approx. 28 to 35° C., preferably approx. 30 to 32° C., until the reaction kicks off and an internal temperature is reached that is higher than 25° C., preferably higher than 30° C. and particularly preferably higher than 35° C. Once addition of the first portion of the material (B) has been completed, the temperature is maintained for a further 0.5 to 3 hours, preferably 1.5 to 2.5 hours and is then cooled to approx. 0° C. The remaining material (B) is added slowly, preferably at a temperature of 0° C. The compound (D) and optionally the Lewis base (E) are then slowly added at approx. 0° C., likewise preferably after addition of the first partial portion of the material (B). Then, before the second portion of the material (B) is added, the temperature is maintained at approx. 0° C. for 0.5 to 3 hours, preferably for 1.5 to 2.5 hours. The remaining material (B) is then slowly added at a temperature of approx. 0° C. The solution, which is added dropwise, is preferably cooled to approx. 10° C. immediately before being added to the reactor.

Once the second portion of the compound (B) has been slowly added at approx. 0° C., the cooling source is preferably removed so that the reaction mixture slowly heats up to a temperature of over 15° C. (up to room temperature) without additional heating.

All stated temperatures include a deviation of ±2° C. Room temperature is understood to be a temperature of 20 to 23° C.

Inert solvents can optionally be added at any stage of the manufacturing process to adjust the rheological properties of the compositions. These solvents are preferably alcohols that are liquid at room temperature and that are incidentally also produced during hydrolysis of the preferably used alkoxides. Particularly preferred alcohols are $C_{1-8}$ alcohols, particularly methanol, ethanol, n-propanol, i-propanol, n-butanol, i-butanol, tert-butanol, n-pentanol, i-pentanol, n-hexanol, n-octanol and n-butoxyethanol. $C_{1-6}$ glycol ethers, particularly n-butoxyethanol, are likewise preferred.

The compositions serving to produce the scratch-resistant coat (S) can further preferably contain conventional additives such as e.g. dyestuffs, flow-control agents, UV stabilisers, photo-initiators, photosensitisers (if the composition is intended to be cured photochemically) and thermal polymerisation catalysts.

The scratch-resistant coat (S) is applied to the substrate primed with epoxy resin using standard coating methods such as e.g. dip coating, spreading, brushing, knifing, rolling, spraying, falling film application, spin coating and centrifuging.

After the scratch-resistant coat (S) has optionally been dried in advance at room temperature, the coated, primed and scratch resistant-coated component is cured. Curing is preferably performed thermally at temperatures in the range from 50 to 300° C., particularly 70 to 200° C. and particularly preferably 90 to 180° C., optionally under reduced pressure.

Under these conditions the cure time should preferably be less than 200 minutes.

The coating thickness of the cured scratch-resistant coat (S) should preferably be 0.5 to 100 $\mu$m, preferably 1 to 20 $\mu$m and particularly 2 to 10 $\mu$m.

If unsaturated compounds and/or photo-initiators are present, curing can also be performed by irradiation, optionally followed by a thermal post-cure.

There is no restriction to the choice of substrates for coating. The compositions according to the invention are preferably suitable for coating substrates containing wood, textiles, paper, stoneware, metals, glass, ceramics and plastics and particularly for coating substrates containing thermoplastics such as are described for example in Becker/Braun, Kunststofftaschenbuch, Carl Hanser Verlag, Munich, Vienna, 1992.

Preferred substrates substantially contain wood, textiles, paper, stoneware, metals, glass, ceramics or plastics, whereby the plastics are preferably thermoplastics.

The substrates particularly preferably consist of wood, textiles, paper, stoneware, metals, glass, ceramics or plastics, whereby the plastics are preferably thermoplastics.

The compositions are most particularly suitable for coating transparent thermoplastics and preferably polycarbonates, most particularly preferably bisphenol-A homopolycarbonate and copolycarbonates based on bisphenol A and 1,1-bis(4-hydroxyphenyl)-3,3,5-trimethylcyclohexane). They are further particularly suitable for coating metals or metallised surfaces.

Sheets, spectacles, optical lenses, car windows and plastic headlamp diffusers can in particular be coated with the compositions obtained.

Polycarbonates in the sense of the present invention are both homopolycarbonates and copolycarbonates; the polycarbonates can be linear or branched in a known manner.

Part, up to 80 mol %, preferably from 20 mol % to 50 mol %, of the carbonate groups in the polycarbonates can be replaced by aromatic dicarboxylic acid ester groups. Such polycarbonates, which contain both acid radicals of the carbonic acid and acid radicals of aromatic dicarboxylic acids incorporated into the molecule chain, are polyester carbonates. They should be included under the general term of polycarbonates.

Polycarbonates can be produced by known methods. Suitable methods for producing polycarbonates are, for example, production from bisphenols with phosgene using the phase boundary method or from bisphenols with phosgene using the homogeneous phase method, known as the pyridine method, or from bisphenols with carbonic acid esters using the melt transesterification method. These manufacturing methods are described for example in H. Schnell, "Chemistry and Physics of Polycarbonates", Polymer Reviews, Volume 9, pages 31 to 76, Interscience Publishers, New York, London, Sidney, 1964. The known manufacturing methods are also described in D. Freitag, U. Grigo, P. R. Müller, H. Nouvertne, "Polycarbonates" in Encyclopedia of Polymer Science and Engineering, Volume 11, Second Edition, 1988, pages 648 to 718 and in U. Grigo, K. Kircher and P. R. Müller "Polycarbonate" in Becker, Braun, Kunststoff-Handbuch, Volume 3/1, Polycarbonate, Polyacetale, Polyester, Celluloseester, Carl Hanser Verlag, Munich, Vienna 1992, pages 117 to 299.

The melt transesterification method is described in particular in H. Schnell, "Chemistry and Physics of Polycarbonates", Polymer Reviews, Volume 9, pages 44 to 51, Interscience Publishers, New York, London, Sidney, 1964, and in DE-A 1 031 512, in U.S. Pat. Nos. 3,022,272, in 5,340,905 and in 5,399,659.

The polycarbonates have average molecular weights $M_w$ (determined by measuring the relative viscosity at 25° C. in $CH_2Cl_2$ and at a concentration of 0.5 g per 100 ml $CH_2Cl_2$) of preferably 12,000 to 400,000 g/mol, particularly preferably 18,000 to 80,000 g/mol and most particularly preferably 22,000 to 60,000 g/mol.

The present invention therefore also provides coated products, including substrates, preferably made from polycarbonate, and the coatings according to the invention.

The following examples illustrate the present invention.

EXAMPLES

Scratch-Resistant Paints for Production of the Scratch-Resistant Coat (S):
Scratch-Resistant Paint S1
Manufacture According to DE-A 4 338 361

In order to produce a boehmite sol, 104.62 g 0.1 n HCl were added to 12.82 g boehmite powder (AlO(OH); Disperal® Sol P 3 from Condea Chemie GmbH, Überseering 40, D-22297 Hamburg, Germany). Subsequent ultrasonic treatment (20 minutes) produced a transparent, colourless solution, to 24.3 g of which was added a mixture consisting of 118.17 g GPTS (3-glycidyl oxypropyl trimethoxysilane) and 62.50 g TEOS (tetraethyl orthosilicate). The reaction mixture was stirred at room temperature for 2 hours and then 18.93 g aluminum tributoxy ethanolate were added under ice cooling. The resulting clear sol was stirred for 2 hours at approx. 0° C. and then 93.14 g of the above boehmite sol and 79.30 g butoxyethanol were added under ice cooling.
Scratch-Resistant Paint S2
Manufacture According to WO 98/05198
Producing the Boehmite Sol 129.04 g boehmite powder (AlO(OH)) (Disperal® Sol P3 from Condea) were added 2 to 1290.40 g 0.1 n HCl with stirring and the pH adjusted to 3 using conc. HCl. Stirring was then continued for 14 h at room temperature and the pH then checked again.

Separately, 1181.7 g (5 mol) GPTS and 625.0 g TEOS (tetraethoxysilane) (3 mol) were mixed and stirred for 10 minutes. 267.3 g of the boehmite sol were added to this mixture at a flow rate of 20 g/min using a metering pump. A few minutes after the addition the sol heated to approx. 28 to 30° C. and after approx. 20 minutes it was clear. The mixture was then stirred for approx. 2 hours at room temperature and then cooled to approx. 0° C. 378.54 g (1 mol) Al(OEtOBu)$_3$ were then added at a flow rate of approx. 3 ml/min at 0° C. ±2° C. After this had been added, stirring was continued for a further 2 hours at approx. 0° C. and then the remaining boehmite sol was added at a flow rate of approx. 13 ml/min and likewise at approx. 0° C. The reaction mixture obtained was then heated up to room temperature without the application of heat. The coating compound obtained was then stored at ±4° C.

Scratch-resistant Paint S3

Manufacture according to DE-A 4 338 361 a) 19.8 g glacial acetic acid, 210 g distilled water and 227 g isopropanol were added to 300 g colloidal silicic acid with 30 wt. % $SiO_2$ content. After thorough intermixing 900 g methyl triethoxysilane were added and the mixture heated to 60° C. with stirring. The mixture was left for 4 hours at this temperature and then a further 1200 g isopropanol were added to the mixture. After the product had been cooled to room temperature the slightly opaque solution was filtered.

b) 340 g isopropanol, 190 g tetraethoxysilane and 360 g methyl triethoxysilane were placed in a vessel fitted with stirrer and reflux condenser. 180 g 0.05 n hydrochloric acid were added to this mixture and it was refluxed for 5 hours to achieve cohydrolysis. After the reaction the mixture was cooled to room temperature. A solution containing a partial hydrolysate of tetraethoxysilane (5.1%, calculated as $SiO_2$) and partial hydrolysate of methyl triethoxysilane (12.6%, calculated as $CH_3SiO_{1.5}$) was obtained.

Before use as a coating material, the two components a) and b) were mixed together in the ratio 1:1 and dissolved in a mixture consisting of 60 parts by weight of n-butanol, 40 parts by weight of acetic acid and 20 parts by weight of toluene.

Scratch-resistant Paint S4

Manufacture according to U.S. Pat. No. 5,041,313

203 g methyl trimethoxysilane were mixed with 1.25 g glacial acetic acid. 125.5 g ammonia-stabilised colloidal silica sol (Ludox® AS from Dupont, E. I. Dupont de Nemours and Company Inc., Wilmington, Del. 19898, USA) and 41.5 g distilled water were added to this mixture with stirring. The resulting solution was then stirred at room temperature for 16 to 18 hours and diluted with 370 g of a 1:1 (parts by weight) mixture of isopropanol/n-butanol and 19 g 2.4-dihydroxybenzophenone were added as UV stabiliser. The mixture was then stirred for 2 weeks (maturing process).

Primer Paints for Production of the Primer Coat (P):

---

Primer paint P1

32 parts by weight

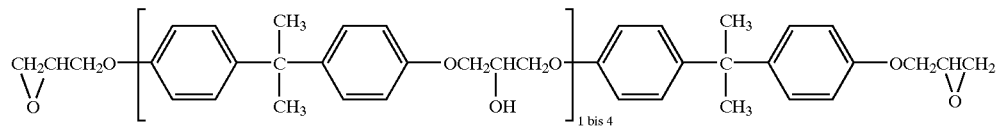

| | |
|---|---|
| 7 parts by wt. | HO CH₂ CH₂—NH—(CH₂—CH₂NH)₃—CH₂—CH₂—NH—CH₂CH₂OH |
| | ethoxylated tetraethylene pentamine |
| 3 parts by wt. | pentamethylene imine |
| 1258 parts by wt. | 4-hydroxy-4-methyl-2-pentanone |

Primer paint P2

27 parts by wt.    oligomeric bisphenol-A-diglycidyl ether having the following formula:

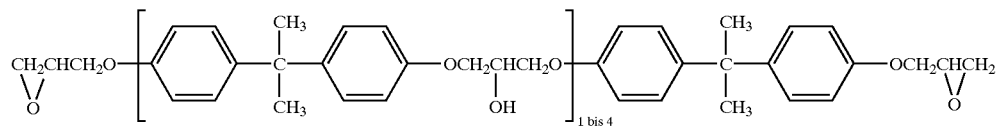

5 parts by wt.    bisphenol-F-diglycidyl ether (as a mixture of isomers) consisting of:

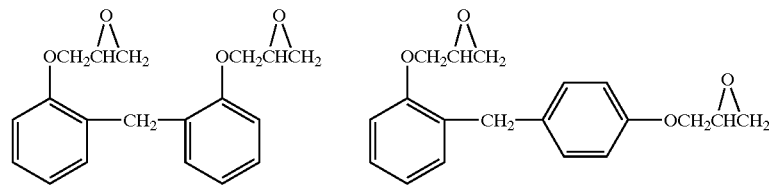

(10 to 15 wt. %)        (50 to 55 wt. %)

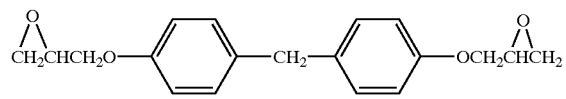

(30 to 35 wt. %)

| | |
|---|---|
| 7 parts by wt. | ethoxylated tetraethylene pentamine |
| 4 parts by wt. | pentamethylene imine |
| 1257 parts by wt. | 4-hydroxy-4-methyl-2-pentanone |

Primer paint P3

| | |
|---|---|
| 29 parts by wt. | bisphenol-A-diglycidyl ether as primer coat composition F |
| 3 parts by wt. | propylene glycol diglycidyl ether ($M_n$ = 555) |
| 8 parts by wt. | ethoxylated tetraethylene pentamine |
| 4 parts by wt. | pentamethylene imine |
| 1256 parts by wt. | 4-hydroxy-4-methyl-2-pentanone |

Primer paint P4

| | |
|---|---|
| 30 parts by wt. | bis-3,4-epoxycyclohexylmethyl adipate |
| 7 parts by wt. | ethoxylated tetraethylene pentamine |
| 3 parts by wt. | pentamethylene imine |
| 1260 parts by wt. | 4-hydroxy-4-methyl-2-pentanone |

Primer paint P5

| | |
|---|---|
| 30 parts by wt. | triglycidyl isocyanurate |
| 7 parts by wt. | ethoxylated tetraethylene pentamine |
| 3 parts by wt. | pentaniethylene mime |
| 1260 parts by wt. | 4-hydroxy-4-methy1-2-pentanone |

Primer paint G6

| | |
|---|---|
| 2 parts by wt. | polymethyl methacrylate (Elvacite ® 2041, Dupont de Nemours Corp.) |
| 98 parts by wt. | methyl isopropyl glycol |

-continued

Primer paint P7

| 2 parts by wt. | polymethyl methacrylate (Elvacite ® 2042, Dupont de Nemours Corp.) |
| 98 parts by wt. | methyl isopropyl glycol |

In order to produce the primer paints P1 to P7, the corresponding solvent such as 4-hydroxy-4-methyl-2-pentanone, methyl isopropyl glycol or n-butanol was prepared at room temperature and the other additives were added in any sequence with stirring. Stirring was continued until a clear, homogeneous solution was obtained. The solutions were stored at room temperature.

To test the resistance to hydrolysis of the polycarbonate components that had been variously primed and then painted with the scratch-resistant coating, the following test pieces were produced and tested:

Sheets of bisphenol-A-homopolycarbonate (Tg=147° C., $M_w$=27500 g/mol) measuring 105×150×4 mm were first cleaned by rinsing with isopropanol and blown dry with ionised air. The sheets were then coated with the relevant primer paint at a dipping rate of 70 cm/min at room temperature and with a relative air humidity of 40%. After evaporation to dust dryness for 30 minutes the sheets underwent a 30-minute heat treatment in a circulating air drying oven at 130° C.

After cooling to room temperature the sheets primed in this way were each coated with one of the above-mentioned scratch-resistant paints S1 to S4 at a dipping rate of 70 cm/min, 40% rel. air humidity and 18° C. After 20 minutes' evaporation the coated sheets were dried for 1 h at 130° C. After curing had been completed the coated sheets were stored for 2 days at room temperature and 50% rel. air humidity and then subjected to the following tests:

Resistance to Hydrolysis

In order to test the resistance to hydrolysis, a cross-hatch adhesion test was performed on the coated sheets in accordance with the standard EN ISO 2409:1994 after immersion in water at 65° C. and after immersion in boiling water.

Immersion in Water at 65° C.

A closable glass vessel filled with deionised water was placed in a drying oven whose temperature was 65±2° C. After the heating process, the coated polycarbonate test pieces, which had previously undergone a cross-hatch adhesion/tape detachment test, were placed in the glass vessel. The test pieces were checked daily for adhesion by means of the tape test on the original cross-hatching. The storage time at which the first loss of adhesion in the tape test from 0 to 1 (EN ISO 2409:1994) occurred was recorded and entered in the results table under water immersion.

Boiling Test

An open beaker filled with deionised water was used for this test. The vessel was insulated with a jacket made from expanded polystyrene (Styropor®). The water was stirred with a magnetic heating stirrer and brought to the boil. A cross-hatch pattern was again applied to the test pieces and they were placed in the boiling water. The test procedure corresponded to that described above, except that the test pieces were checked after half an hour. Once again the storage time at which the first loss of adhesion in the tape test from 0 to 1 (EN ISO 2409:1994) occurred was recorded. The times were entered as hours (h) under boiling test in the results table.

Results

| Test no. | Coating compound | Primer coat composition | Water immersion (days) | Boiling test (h) |
| --- | --- | --- | --- | --- |
| 1 | S1 | P1 | >16 | >4 |
| 2 | S1 | P2 | >16 | >4 |
| 3 | S1 | P3 | >16 | >4 |
| 4 | S1 | P4 | >16 | >4 |
| 5 | S1 | P5 | >16 | >4 |
| 6 (comparative) | S1 | P6 | 1 | 0.5 |
| 7 (comparative) | S1 | P7 | 1 | 0.5 |
| 8 | S2 | P1 | >16 | >4 |
| 9 | S2 | P2 | >16 | >4 |
| 10 | S2 | P3 | >16 | >4 |
| 11 | S2 | P4 | >16 | >4 |
| 12 | S2 | P5 | >16 | >4 |
| 13 (comparative) | S2 | P6 | 1 | 0.5 |
| 14 (comparative) | S2 | P7 | 1 | 0.5 |
| 15 (comparative) | S3 | P1 | 3 | 1 |
| 16 (comparative) | S3 | P2 | 3 | 1 |
| 17 (comparative) | S3 | P3 | 3 | 0.5 |
| 18 (comparative) | S3 | P4 | 2 | 1 |
| 19 (comparative) | S3 | P5 | 3 | 1 |
| 20 (comparative) | S4 | P1 | 6 | 1 |
| 21 (comparative) | S4 | P2 | 5 | 1 |
| 22 (comparative) | S4 | P3 | 3 | 1 |
| 23 (comparative) | S4 | P4 | 3 | 1 |
| 24 (comparative) | S4 | P5 | 3 | 1 |

As the test results show, the polycarbonate sheets coated with the scratch-resistant epoxy silane-based coatings (S1 and S2) possess excellent water resistance if an epoxy resin primer coat (P) as described under P1, P2, P3, P4 and P5 is present between the polycarbonate and the scratch-resistant coat (S). See tests 1 to 5 and 7 to 12.

By comparison, the sheets that are coated with a combination of non-epoxy silane-based scratch-resistant paint (S3 and S4) and epoxy resin primer coats (P1, P2, P3, P4 and P5)—comparative tests 15 to 24—or a combination of epoxy silane-based scratch resistant paint (S1 or S2) and polyacrylate primer coats (P6 or P7) described in the literature and in commercial use possess substantially lower resistances to water.

The test figures for these reference test pieces were a maximum of 5 days in the water immersion test (65° C.) and a maximum of 1 hour in the boiling test. The coatings according to the invention achieve values of greater than 16 days and 4 hours respectively.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A coating comprising:
   a primer coat adhering to a substrate to be coated; and
   a scratch-resistant coat adhering to the primer coat,
   wherein the primer coat contains a cured epoxy resin consisting of,
   one or more hardeners,
   one or more multi-epoxy functional compounds, and
   optionally an additive selected from the group consisting of dyestuffs, flow-control agents, inorganic fillers, organic fillers, UV stabiliser, infrared absorbers and combinations thereof,
   further wherein the scratch-resistant coat consists of,
   one or more hydrolysable silanes containing one or more epoxy groups,
   optionally a lewis base,
   optionally a surfactant,
   optionally an aromatic polyol,
   optionally a particulate material selected from the group consisting of oxide or oxide hydrate of Si, Al, Ti, Zr, Zn, Sn or Ce with a particle size in the range from 2 to 50 nm, and
   optionally at least one compound selected from the group consisting of $Si(OCH_3)_4$, $Si(OC_2H_5)_4$, $CH_3$—$Si(OC_2H_5)_3$, $(CH_3)_2Si(OCH_3)_2$ and $(CH_3)_2Si(OC_2H_5)_2$.

2. The coating according to claim 1 wherein the hardener is selected from the group consisting of amines, anhydrides and mixtures thereof, wherein the multi-epoxy functional compound is selected from the group consisting of aromatic glycidyl compounds, cycloaliphatic glycidyl compounds, heterocyclic glycidyl compounds, cycloaliphatic and aliphatic epoxy corn compounds and mixtures thereof that can serve as educts for epoxy resins, and wherein the hydrolysable silane is selected from the group consisting of compounds having the formulae (I) or (II):

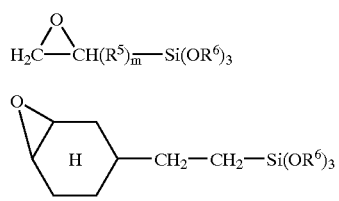

wherein
R$^5$ represents a divalent hydrocarbon radical comprising a maximum of 9 carbon atoms or a divalent radical comprising a maximum of 9 carbon atoms consisting of C, H and O atoms, wherein the O atom is present as an ether bond radical, and
R$^6$ represents an aliphatic hydrocarbon radical comprising a maximum of 4 carbon atoms, an acyl radical comprising a maximum of 4 carbon atoms or a radical having the formula $(CH_2CH_2O)_nZ$, in which n is at least 1 and Z represents an aliphatic hydrocarbon radical comprising a maximum of 4 carbon atoms, and
m represents 0 or 1,
compounds having the general formula (III)

$$R_3SiR' \qquad (III)$$

wherein
R represents the same or different hydrolysable group and
R' represents a glycidyl or glycidyloxy-$(C_{1-20})$ alkylene radical and mixtures thereof.

3. The coating according to claim 2, wherein the multi-epoxy functional compound is a cycloaliphatic epoxy compound that can serve as an educt for cycloaliphatic epoxy resins.

4. The coating according to claim 1, wherein the hardener is selected from the group consisting of amines, anhydrides and mixtures thereof and wherein the multi-epoxy functional compound is selected from the group consisting of bisphenol-A diglycidyl ethers of the formula

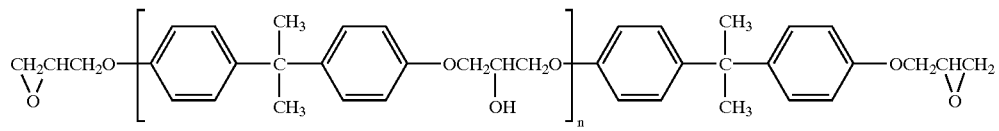

wherein
n=0 to 30,
3,4-epoxycyclohexane carboxylic acid-3,4'-epoxycyclohexylmethyl ester of the formula

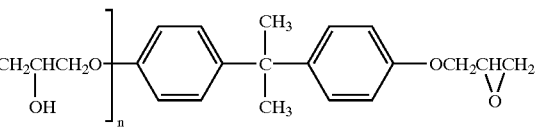

bis(3,4-epoxycyclohexylmethyl) adipate of the formula

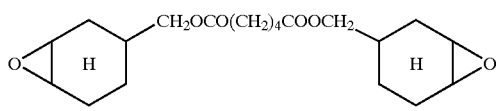

3-(3,4'-epoxycyclohexyl)-2,4-dioxaspiro[5,5]-8,9-epoxy undecane of the formula

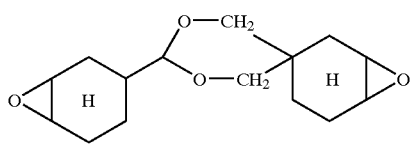

and mixtures thereof,
and wherein the hydrolysable silane is selected from the group consisting of 3-glycidyl oxypropyl trimethoxysilane and 2-(3,4-epoxycyclohexyl) ethyl trimethoxysilane.

5. A coated product comprising the coating according to any one of claims 1 to 4 and a substrate.

6. The coated product according to claim 5, wherein the substrate is selected from the group consisting of wood, textiles, paper, stoneware, metals, glass, ceramics and plastics.

7. The coated product according to claim 6, wherein the substrate comprises polycarbonate.

8. One member selected from the group consisting of sheets, spectacles, optical lenses, car windows and plastic headlamp diffusers comprising the coated product according to claim 5.

9. A method of coating a substrate comprising applying thereto a composition comprising, a primer coat adhering to the substrate to be coated, and a scratch-resistant coat adhering to the primer coat, wherein the primer coat contains a cured epoxy resin consisting of, one or more hardeners, one or more multi-epoxy functional compounds, and optionally an additive selected from the group consisting of dyestuffs, flow-control agents, inorganic fillers, organic fillers, UV stabiliser, infrared absorbers and combinations thereof, further wherein the scratch-resistant coat consists of, one or more hydrolysable silanes containing one or more epoxy groups, optionally a lewis base, optionally a surfactant, optionally an aromatic polyol, optionally a particulate material selected from the group consisting of oxide or oxide hydrate of Si, Al, Ti, Zr, Zn, Sn or Ce with a particle size in the range from 2 to 50 nm, and optionally at least one compound selected from the group consisting of $Si(OCH_3)_4$, $Si(OC_2H_5)_4$, $CH_3-Si(OC_2H_5)_3$, $(CH_3)_2Si(OCH_3)_2$ and $(CH_3)_2Si(OC_2H_5)_2$.

* * * * *